United States Patent [19]

Lance

[11] 4,249,295
[45] Feb. 10, 1981

[54] METHOD OF MOUNTING A TOOL BOX ON A TRUCK

[76] Inventor: Bill W. Lance, 735 Concord Ave., San Jose, Calif. 95128

[21] Appl. No.: 21,788

[22] Filed: Mar. 19, 1979

[51] Int. Cl.³ ............................................. B23P 17/00
[52] U.S. Cl. ........................................ 29/416; 296/10; 296/24 R
[58] Field of Search ...................... 29/401.1, 412, 416; 224/42.42 R; 296/3, 10, 24 R, 37.6, 164, 166, 171, 183

[56] References Cited

U.S. PATENT DOCUMENTS

| | | | |
|---|---|---|---|
| 2,504,222 | 4/1950 | Otto | 296/24 R |
| 2,616,754 | 11/1952 | Stahl | 296/24 R X |
| 2,722,352 | 11/1955 | Dehnel | 296/24 R |
| 2,772,913 | 12/1956 | Holan et al. | 296/183 |
| 2,978,153 | 4/1961 | Brindle | 296/37.6 X |
| 3,068,038 | 12/1962 | Douglass | 296/183 X |
| 3,245,713 | 4/1966 | Ogilvie | 296/24 R |
| 3,326,595 | 6/1967 | Ogilvie | 296/37.6 |
| 4,027,739 | 6/1977 | Allenthorp et al. | 296/164 X |
| 4,126,349 | 11/1978 | Nelson et al. | 296/24 R |
| 4,152,020 | 5/1979 | Brown et al. | 296/3 |

FOREIGN PATENT DOCUMENTS

1934289 1/1971 Fed. Rep. of Germany ........ 296/24 R

Primary Examiner—Ervin M. Combs
Attorney, Agent, or Firm—Gerald L. Moore

[57] ABSTRACT

A tool box for a pickup truck which is mounted by removing a portion of the forward section of the bed and placing the box between the remainder of the bed and the cab. The tool box permits easy storage of tools and the like by access to compartments from both sides of the truck.

6 Claims, 6 Drawing Figures

METHOD OF MOUNTING A TOOL BOX ON A TRUCK

BACKGROUND OF THE INVENTION

In using a pickup truck for various trades, it is necessary to maintain tools in the bed as well as provide for the hauling of materials. For instance a plumber needs various plumbing tools and also must carry pipe, pipe couplings and other paraphernalia necessary for plumbing jobs. Various types of tool boxes have been provided in the past which generally fit into a truck bed to allow for storage of tools. While such tool boxes are satisfactory for the purpose of safeguarding the tools by providing a locked container and generally serve to maintain the tools in a waterproof environment, access to the tools is sometimes difficult. In addition such tool boxes are generally too small to hold all of the tools necessary for most trades.

In attempts to overcome the above-named difficulties there have originated special beds for pickup trucks which generally comprise tool boxes being substituted for the side walls of the bed while leaving a smaller center area open for hauling miscellaneous materials. While such tool boxes provided the advantage of being accessible from the side of the truck still they require the total replacement of the pickup bed and also take up much of the bed hauling space which would otherwise be available. In addition such special beds are quite expensive and require the replacement of the total bed when converting existing pickup trucks.

It is the purpose of the present invention to provide a tool box which enables the adaptation of existing pickup trucks for the storage of a multitude of tools or other paraphernalia which are easily reached and with a minimum reduction in the hauling space of the bed.

SUMMARY OF THE INVENTION

A tool box and the method of mounting on a pickup truck or the like comprising a box for extending lengthwise across the truck in a space made available by the removal of a forward portion of the pickup truck bed. The tool box comprises compartments accessible from each side of the truck and, in the preferred embodiment, includes an open-top compartment at the top thereof for storage of larger equipment or materials. Provision is made for viewing through the rear view window of the truck.

DESCRIPTION OF THE INVENTION

Figure 1:
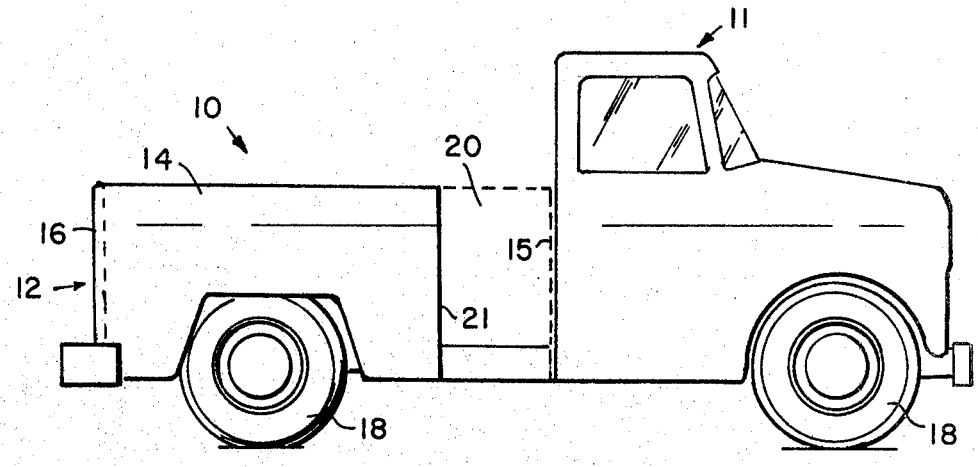
FIG. 1 shows a standard pickup truck with the portion of the bed to be removed for placement of the tool box in dotted outline.
Figure 4:
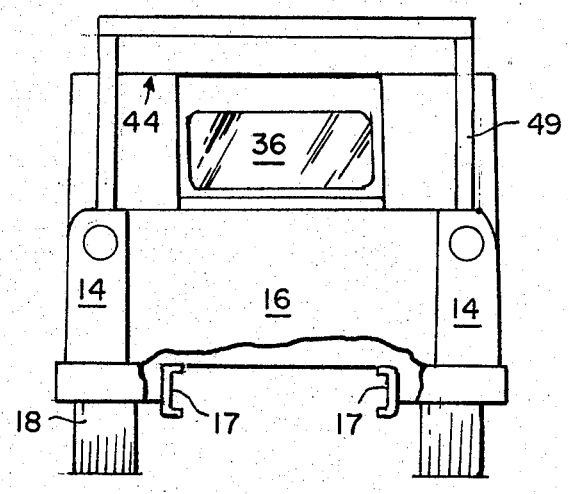
FIG. 4 is a rear view of a pickup truck with the tool box mounted.

In FIG. 1 is shown a pickup truck 10 of the kind in which the subject invention can be incorporated and including a passenger cab 11 and a bed 12 for hauling. The bed comprises a bottom 13, the two side walls 14, a front wall 15 and rear wall 16. The vehicle includes frame members 17 (shown in FIG. 4) extending lengthwise for support of an undercarriage including the wheels 18. While the invention can be incorporated in other types of vehicles, the pickup truck is shown primarily because it is widely used in transporting tools and materials for the practice of many of the trades.

Figure 3:
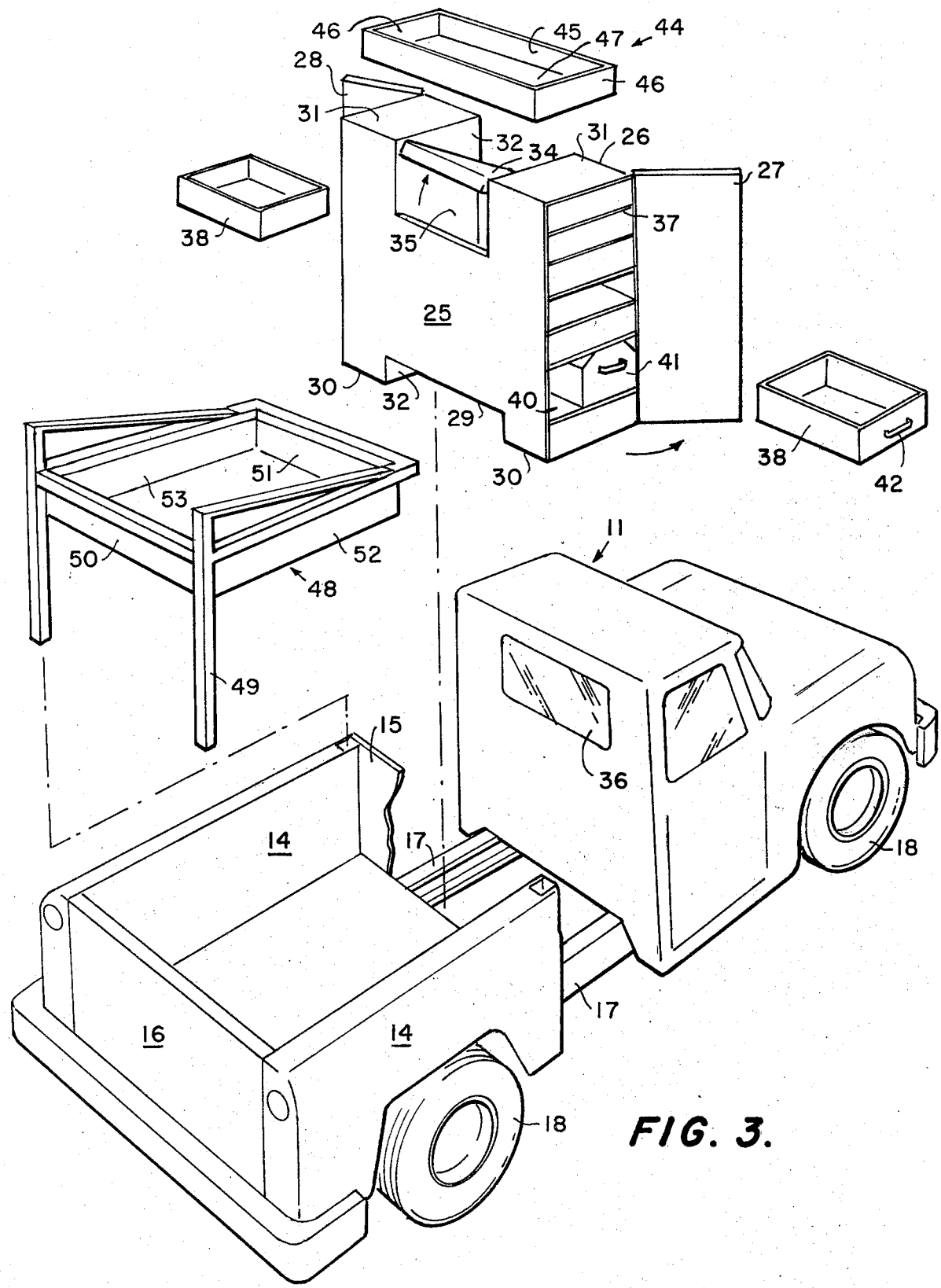
FIG. 3 is an exploded view of the tool box and pipe rack.

In accordance with the present invention there is provided a method and a tool box for converting a truck such as the one shown in the drawings for the efficient transportation of tools while not hampering the use of the truck for the transportation of other materials. Accordingly as shown in FIG. 1 a forward portion 20 of the side walls of the bed and the connecting portion of the bottom 13 are removed by cutting the side walls 14 along the vertical line 21. The bottom 13 is also cut along a line connecting the vertical lines 21 of the side walls. Such removal also deletes the forward wall 15 of the bed. Thereafter the forward wall 15 is removed from the removed side wall portions and is reattached to the forward edges of the remaining side walls 14 and the forward edge of the bed bottom 13 on the truck so that the vehicle bed appears as shown in FIG. 3. A tool box 22 then is inserted into the space between the front wall 15 of the bed and the cab 11. The tool box is configured to set on the frame members 17 of the truck chassis and be firmly fixed thereto so that the weight of the box and enclosed tools are directly carried by the truck frame.

The tool box comprises a rear wall 25, a front wall 26 and side doors or walls 27 and 28 which are hinged to the side edges of the front wall 26 and approximately coplanar with the bed side walls 14. The bottom wall 29 includes lower portions 30 spaced apart sufficiently to fit to the outer sides of the frame members 17 and provide structure for bolting to the frame members. The top wall 31 is divided into two sections to provide a space therebetween bordered by the inner side walls 32 and a bottom door 34. The bottom door 34 allows for access to a compartment 35 which is walled by the side wall members 32 extending downward to the bottom wall 30. In this manner there is provided an opening so the driver can view rearward through the rear window 37 of the cab.

The side compartments each include a plurality of horizontally positioned shelves 37 for the support of drawers 38 or to form compartments 39 and 40 into which will fit such articles as the tool boxes 41. Pull handles 42 are provided which can be grasped to pull out the drawers. Fixed to the top wall 31 is an open top compartment 44 comprising sidewalls 45 and end walls 46 joined by a bottom 47. This compartment is provided for carrying axes, shovels or construction material as needed. In this manner the tool box provides for ready storing of all types of tools and equipment which can be safeguarded by the closing and locking of the doors 27, 28 and 34.

Figure 2:
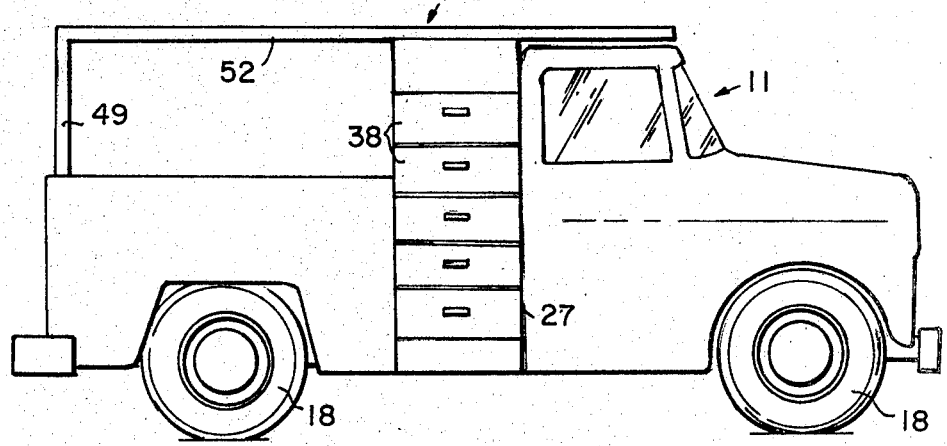
FIG. 2 is a side view of a pickup truck showing the tool box of the subject invention mounted thereon.

There can also be provided a pipe rack 48 comprising the uprights 49 and the crosspieces 50 and 51 with the side pieces 52 and 53. The pipe rack extends forward with the forward ends of the side pieces and the crosspiece 51 fixed to the top of the tool box in the manner shown in FIG. 2 for the carrying of elongated objects such as pipes or ladders. The tool box thus serves as the forward support for such a rack and the bed space remains uncluttered for hauling other objects.

Figure 5:
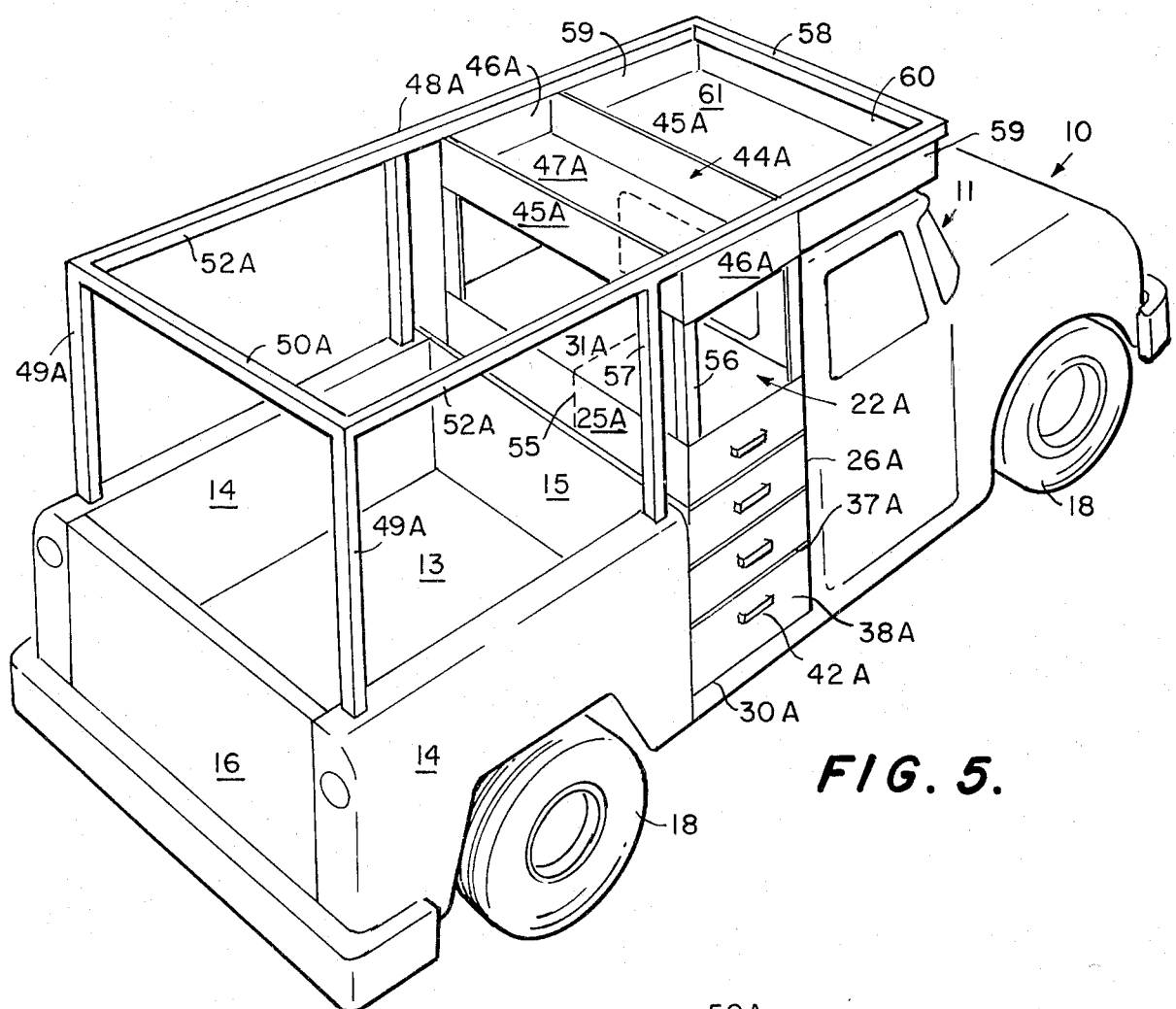
FIG. 5 is a perspective view of a pickup truck with a second embodiment of the invention mounted thereon.
Figure 6:
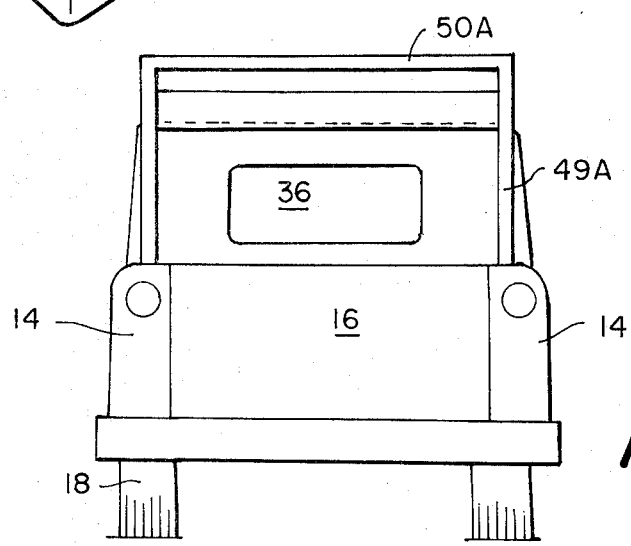
FIG. 6 is a rear view of the truck shown in FIG. 5.

A second embodiment of the invention is shown in FIG. 5. The bottom 13 of the pickup bed is not removed when the forward portions of the side walls 14 are cut but instead the front wall 15 is shifted rearward and fixed to the forward edge of the side walls above the bottom. Thereafter a tool box 22A is set on the forward portion of the bottom 13 between the cab 11 and the forward wall 15 of the bed. The bed bottom thus supports the tool box.

The tool box comprises a rear wall 25A and a forward wall 26A connected by a bottom wall 30A and a top wall 31A. There is formed an inner compartment divided into two sections by a center wall 55 as shown in dotted outline. Connected to the front and back walls at each corner of the tool box are supports 56 extending upwards to an open-topped compartment comprising front and rear walls 45A, side walls 46A and a bottom 47A. Shelves 37A divide each side compartment horizontally and serve to support pullout drawers 38A having pull handles 42A.

Thus in the embodiment shown in FIG. 5 there is provided complete viewing through the rear window 36 of the truck because the storage compartment 44A is spaced above the lower section of the tool box. If desired there can also be mounted a pipe rack 48A having uprights 49A fitting into wells in the side walls 14 of the truck and joined by a crosspiece 50A and side pieces 52A. The forward uprights 57 are supported in wells in the forward edges of the side walls 14. The sidepieces 52A extend forward over the cab of the truck and are joined at the forward ends by a crosspiece 58. Positioned over the cab 11 of the truck is a storage compartment for the carrying of materials or tools and comprising the side walls 59, a forward wall 60 and a bottom 51. Such a compartment is supported by the forward extensions of the pipe rack and above the cab.

Thus in the manner described there is provided a tool box and material carrier supported directly by the frame and near the center of gravity of the truck so as to correctly support the weight for proper road handling. The capacity of such a tool box is approximately 27 to 40 cubic feet depending upon the width of the pickup truck on which it is mounted. This capacity is roughly three times the capacity of other tool boxes occupying the same bed space. In addition the tool box is accessible from the sides of the truck and the storage area is divided into shelves and drawers serving to separate the tools and protect them from damage. The storage areas are lockable to secure tools and material stored therein.

It is also contemplated within the scope of this invention to remove only the forward portion of one side wall of the truck bed and to set the tool box in the position of the removed portion of the one side wall. In this instance, the tool box is positioned behind the cab and against the other bed side wall. Only that portion of the tool box extending above the remaining side wall is accessible but all the tool box is accessible from the side on which the bed side wall is removed. The advantage of supporting the tool box near the center of gravity of the truck and on the truck frame is still realized.

The invention claimed:

1. The method of mounting a tool box on a truck having a passenger cab and a frame supporting a bed positioned behind and adjacent to the cab and formed of a front wall, side walls and a bottom mounted on the frame, said method comprising the steps of:

removing a forward portion of the bed side walls and the bed front wall adjacent the cab;

placing a tool box adjacent the cab and extending across the bed in the position of the removed portions of the side walls, said tool box having side walls approximately coplanar with the bed side walls;

locating storage compartments in at least one of said side walls of said tool box whereby tools can be retrieved from the side of the truck; and reinstalling the bed front wall in a position rearward of the tool box and joining the side walls remaining after the forward portions are removed.

2. The method as defined in claim 1 wherein a portion of the bottom of the bed adjacent the removed side wall portions is also removed.

3. The method as defined in claim 2 including the step of locating storage compartments in both end walls of said tool box.

4. The method as defined in claim 2 including the step of positioning a storage compartment having side walls and a bottom wall across the top of said tool box.

5. The method as defined in claim 2 including the step of positioning storage compartments in said tool box accessible from the bed of the truck.

6. The method as defined in claim 5 including the step of positioning a pipe rack above said truck bed joining with said storage compartment.

* * * * *